(12) United States Patent
Ye et al.

(10) Patent No.: US 10,003,110 B2
(45) Date of Patent: Jun. 19, 2018

(54) CHARGE-FREE MIXING ENTROPY BATTERY

(71) Applicant: The Board of Trustees of the Leland Stanford Junior University, Stanford, CA (US)

(72) Inventors: Meng Ye, Stanford, CA (US); Yi Cui, Stanford, CA (US); Mauro Pasta, Ubiale Clanezzo (IT); Xing Xie, Pasadena, CA (US); Craig S. Criddle, Stanford, CA (US); Vaishnav V. Davey, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 201 days.

(21) Appl. No.: 15/157,126

(22) Filed: May 17, 2016

(65) Prior Publication Data
US 2016/0344069 A1    Nov. 24, 2016

Related U.S. Application Data

(60) Provisional application No. 62/163,280, filed on May 18, 2015.

(51) Int. Cl.
H01M 10/44 (2006.01)
H01M 8/22 (2006.01)
H01M 10/36 (2010.01)

(52) U.S. Cl.
CPC .......... *H01M 10/44* (2013.01); *H01M 8/227* (2013.01); *H01M 10/36* (2013.01)

(58) Field of Classification Search
None
See application file for complete search history.

(56) References Cited

U.S. PATENT DOCUMENTS

2012/0135282 A1*  5/2012  La Mantia ............. H01M 6/34
                                                    429/70

* cited by examiner

*Primary Examiner* — Sarah A. Slifka
*Assistant Examiner* — Haroon S. Sheikh
(74) *Attorney, Agent, or Firm* — Foley & Lardner LLP; Cliff Z. Liu

(57) ABSTRACT

Described herein is a mixing entropy battery including a cationic electrode for sodium ion exchange and an anionic electrode for chloride ion exchange, where the cationic electrode includes at least one Prussian Blue material, and where the mixing entropy battery is configured to convert salinity gradient into electricity.

15 Claims, 10 Drawing Sheets

CHARGE-FREE MIXING ENTROPY BATTERY

CROSS-REFERENCE TO RELATED APPLICATION

This application claims the benefit of U.S. Provisional Application No. 62/163,280, filed on May 18, 2015, the disclosure of which is incorporated herein by reference in its entirety.

STATEMENT REGARDING FEDERALLY SPONSORED RESEARCH OR DEVELOPMENT

This invention was made with Government support under contract 1028968 awarded by the National Science Foundation. The Government has certain rights in the invention.

TECHNICAL FIELD

This disclosure generally relates to a mixing entropy battery and, more particularly, a charge-free mixing entropy battery.

BACKGROUND

Salinity-gradient energy, also referred to as "blue energy", exists in estuaries when freshwater and seawater mix. Globally, the potential blue energy from mixing river water with seawater is estimated at about 2 TW. Different technologies have been proposed to recover this untapped energy source, including a mixing entropy battery (MEB).

A proposed MEB is demonstrated to recover electricity from seawater and wastewater effluent at an efficiency of about 68%. However, the high cost of electrode materials used, as well as an energy investment during a charge step, made the MEB less practical for full-scale applications. Therefore, a need exists for an improved, low-cost MEB that omits a charge step and reduces an upfront energy investment.

It is against this background that a need arose to develop the embodiments described in this disclosure.

SUMMARY OF DISCLOSURE

Described herein according to some embodiments is a mixing entropy battery including a cationic electrode for sodium ion exchange and an anionic electrode for chloride ion exchange, where the cationic electrode includes at least one Prussian Blue material, and where the mixing entropy battery is configured to convert salinity gradient into electricity.

In some embodiments, the Prussian Blue material includes a hexacyanometallate material having a formula of $A_xPR(CN)_6$ or $A_xPR(CN)_6 \cdot nH_2O$, wherein $R(CN)_6$ is a hexacyanometallate group, P is at least one transition metal cation, R is at least one transition metal cation, and A is at least one interstitial site that can be occupied by at least one alkali metal cation, such as sodium ions. In some embodiments, $R(CN)_6$ is $Fe^{2+}(CN)_6$, and P is $Fe^{3+}$. In some embodiments, x is in the range of 0 to 2. More generally, examples of suitable P and R metal cations include: (1) cations of transition metals, such as top row (or row 4) transition metals (e.g., Ti, Va, Cr, Mn, Fe, Co, Ni, Cu, and Zn), row 5 transition metals (e.g., Y, Zr, Nb, Mo, Tc, Ru, Rh, Pd, Ag, and Cd), and other transition metals; (2) post-transition metals (e.g., Al, Ga, In, Sn, Tl, Pb, and Bi); (3) metalloids (e.g., B, Si, Ge, As, Sb, Te, and Po); and (4) lanthanides (e.g., La and Ce). In addition to, or in place of, a Prussian Blue material, the cationic electrode can include other electrode materials used for sodium ion batteries, such as sodium manganese oxide, titanium dioxide, disodium terephthalate, and so forth.

In some embodiments, the anionic electrode includes a polymer that can be doped/undoped by anions (p-type doping) and is conductive after being doped. In some embodiments, the anionic electrode comprises polypyrrole. In some embodiments, the polypyrrole is optionally substituted at one or more carbon atoms in a cyclic moiety of a repeating unit. Substituents can be, for example, alkyl groups and alkoxy groups. More generally, examples of suitable anionic electrode materials include electronically conductive polymers such as nitrogen-containing aromatic polymers (e.g., polycarbazoles, polyindoles, polyanilines, and polyazepines), sulfur-containing aromatic polymers (e.g., poly(3,4-ethylenedioxythiophene)), polythiophenes, polyfluorenes, polyphenylenes, polypyrenes, polyazulenes, polynapthalenes, polyacetylenes, and poly(p-phenylene vinylene).

In some embodiments, the cationic electrode and anionic electrode reversibly react with, or otherwise interact with, $Na^+$ and $Cl^-$ respectively. In some embodiments, the cationic electrode reversibly reacts with $Na^+$ or $K^+$. In some embodiments, the anionic electrode reversibly react with $Cl^-$.

In some embodiments, the cationic electrode and anionic electrode potentials change in reverse directions with a NaCl concentration change. In some embodiments, when the mixing entropy battery is flushed with seawater, current flows from the cationic electrode to the anionic electrode spontaneously because a voltage is positive. In some embodiments, when the mixing entropy battery is flushed with freshwater, the voltage becomes negative, resulting in spontaneous current flow in the reverse direction. In some embodiments, the anionic electrode and the cationic electrode are disposed within a housing or other suitable container. The housing includes a set of one or more inlets, which are fluidly connected to a set of fluid conveyance mechanisms (e.g., pumps) and a set of reservoirs (or other suitable containers). In particular, a first reservoir serves as a source of a low NaCl concentration solution (e.g., freshwater), which can be conveyed into the housing through one inlet of the housing, and a second reservoir serves as a source of a high NaCl concentration solution (e.g., seawater), which can be conveyed into the housing through another inlet of the housing. As further described below, the fluid conveyance mechanisms are operated so as to substitute or exchange one solution within the battery with another solution, and to synchronize such substitution with respect to operations of the battery. Upon substitution with one solution, a departing solution exits the battery through an outlet of the housing. A controller can be included to control the operation of the battery, which controller can be implemented in software, hardware, or a combination of software and hardware.

In some embodiments, the mixing entropy battery operates substantially free of energy input except for pumping energy used during solution exchanges. In some embodiments, pumping energy used during solution exchanges accounts for at least about 90% of all energy input during operation of the mixing entropy battery, such as at least about 95%, at least about 98%, at least about 99%, and up to 100% of all energy input.

In some embodiments, the mixing entropy battery converts salinity gradient into electricity at an efficiency of at least about 80%, or at least about 85%, or at least about 90%, or at least about 95%.

In some embodiments, the mixing entropy battery retains at least about 80%, or at least about 85%, or at least about 90%, or at least about 95% of energy recovery capacity over 50 cycles of operation.

Another aspect of some embodiments of this disclosure relates to a method for converting salinity gradient into electricity, including alternatively flushing freshwater and seawater into a mixing entropy battery including a cationic electrode and an anionic electrode, where the freshwater or seawater flushed into the mixing entropy battery contacts both the cationic electrode and the anionic electrode, and where the cationic electrode includes at least one Prussian Blue material.

In some embodiments, the mixing entropy battery operates substantially free of energy input except for pumping energy used for flushing freshwater and seawater. In some embodiments, pumping energy used during flushing accounts for at least about 90% of all energy input during operation of the mixing entropy battery, such as at least about 95%, at least about 98%, at least about 99%, and up to 100% of all energy input.

A further aspect of some embodiments of this disclosure relates to a mixing entropy battery including a cationic electrode and an anionic electrode, where potentials of the cationic electrode and anionic electrode are in the same or similar range, where the mixing entropy battery is configured to convert salinity gradient into electricity, and where the mixing entropy battery operates substantially free of energy input except for pumping energy used during solution exchanges. A suitable pair of cationic and anionic electrodes can be identified by cycling the cationic electrode and the anionic electrode in seawater or freshwater. Their potential ranges can have an overlapping range that is greater than a voltage change when exchanging solution between seawater and freshwater. For example, for typical seawater and freshwater, the voltage change is about 170 mV, so that in some embodiments the potentials of the anionic electrode and the cationic electrode can have an overlapping range of at least about 170 mV. In further embodiments the potentials of the anionic electrode and the cationic electrode can have an overlapping range of at least about 150 mV, or at least about 160 mV, or at least about 180 mV, or at least about 200 mV, or at least about 220 mV, or at least about 250 mV. The potentials of the anionic electrode and the cationic electrode can be relative to Ag/AgCl electrode or other reference electrode, and can be measured over NaCl concentrations from about 0.024 M and up to about 0.3 M, up to about 0.6 M, up to about 1 M, or up to about 2 M.

In some embodiments, the potentials of cationic electrode and anionic electrode change in reverse directions with a NaCl concentration change. In some embodiments, when the mixing entropy battery is flushed with seawater, current flows from the cationic electrode to the anionic electrode spontaneously because a voltage is positive. In some embodiments, when the mixing entropy battery is flushed with freshwater, the voltage becomes negative, resulting in spontaneous current flow in the reverse direction.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

DETAILED DESCRIPTION

Embodiments of this disclosure are directed to a mixing entropy battery (MEB), which extracts energy of both cations and anions from a difference in concentration of those ions in two solutions. In some embodiments, the MEB includes electrodes which store and release ions, as one solution having one concentration of the ions is substituted or exchanged with another solution having a different concentration of the ions. One solution can be freshwater or river water with a lower concentration of Na$^+$ and Cl$^-$ ions, and another solution can be seawater with a higher concentration of Na$^+$ and Cl$^-$ ions. Other solutions having different concentrations of other types of ions can be used. In some embodiments, the MEB includes two different electrodes to provide anion and cation selectivity: an anionic electrode selectively stores and releases anions (e.g., Cl$^-$ ions), and a cationic electrode selectively stores and releases cations (e.g., Na$^+$ ions). Energy is extracted from a difference in concentration of the ions between two solutions (e.g., river water versus seawater). To extract desirable amounts of energy, this difference in concentration can be such that a molar concentration (or molarity M) of the ions in a high concentration solution is at least about 1.5 times the corresponding concentration of the ions in a low concentration solution, such as at least about 2 times, at least about 5 times, at least about 10 times, at least about 15 times, or at least about 25 times, and up to about 50 times, about 100 times, or more.

Figure 2:
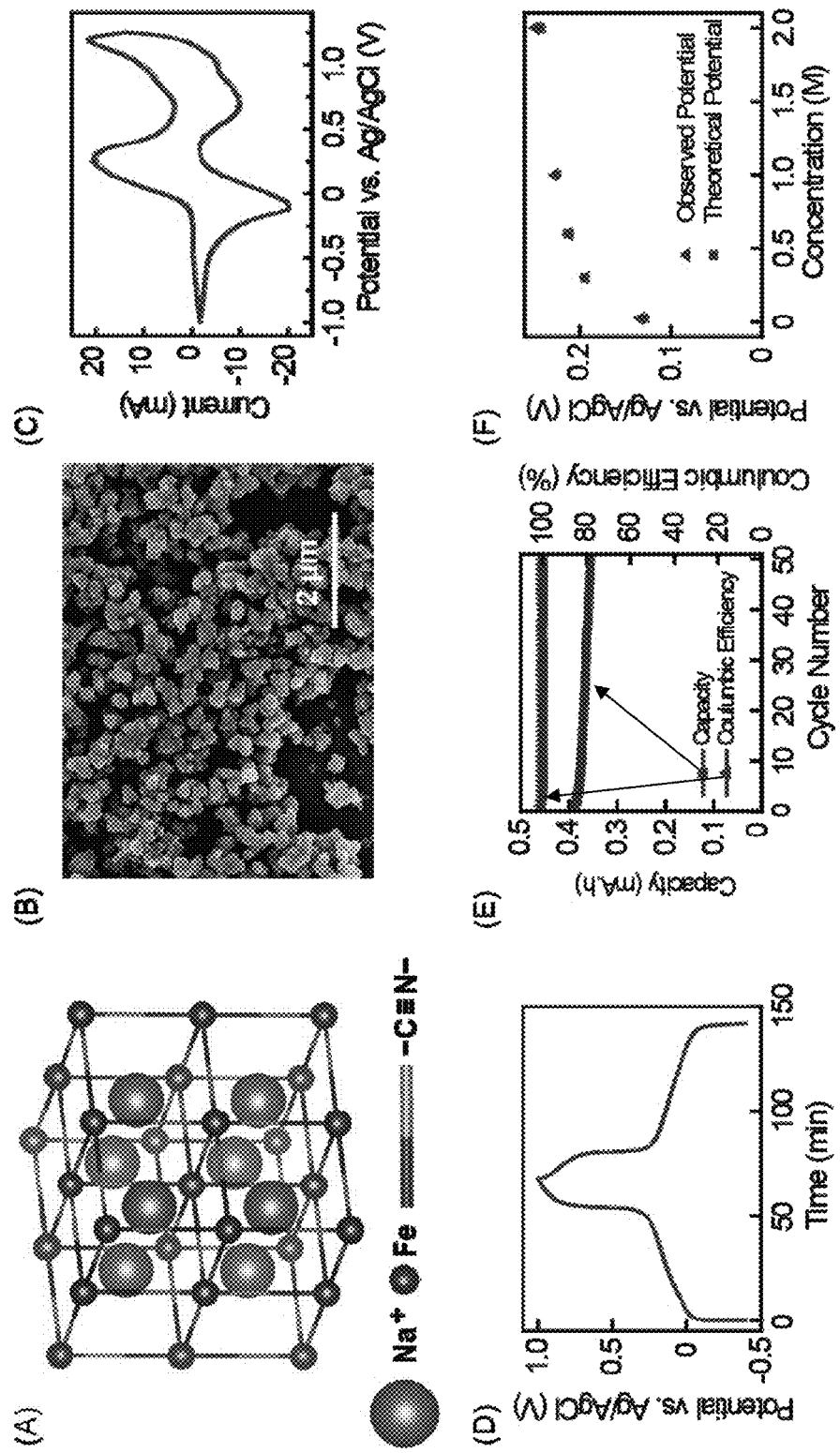
FIG. 2 shows: (A) Crystal structure of a PB material showing an open-framework structure allowing insertion and extraction of Na$^+$; (B) Scanning electron microscopy image of the PB material; (C) Cyclic voltammetry of a PB electrode in about 0.6 M NaCl solution; (D) Galvanostatic cycle of the PB electrode in about 0.6 M NaCl solution; (E) Cycling performance of the PB electrode, showing coulombic efficiency and discharge capacity over 50 cycles; and (F) change in PB electrode potential with different NaCl concentrations (about 0.024 M, about 0.3 M, about 0.6 M, about 1 M, and about 2 M).

Disclosed herein according to some embodiments is a charge-free MEB incorporating desirable electrode materials. Prussian Blue (PB) is employed as a cationic electrode material of some embodiments. PB and its analogues have an open-framework structure (FIG. 2A). PB materials have a formula of $A_xPR(CN)_6 \cdot nH_2O$, in which $R(CN)_6$ is a hexacyanometallate group forming a cubic structure; P is a transition metal cation; R is a transition metal cation; and A is an interstitial site, which can be occupied by alkali metal cations. In the case of PB, P and R are cations of Fe. The open-framework structure of PB materials allows for fast and reversible insertion/extraction of alkali metal cations into/from interstitial sites. PB materials are stable and have excellent cycling performance with a long cycle life. Further, PB materials are low cost materials.

Figure 5:
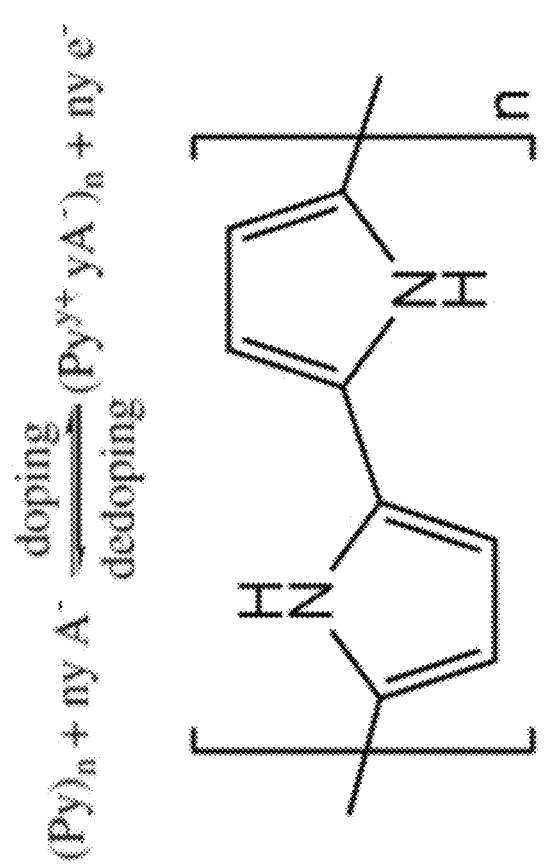
FIG. 5 shows a chemical structure and doping/de-doping of PPy as an anionic electrode material of a MEB.

In some embodiments, an example PB material is used as a cationic electrode material, in which $R(CN)_6$ is $Fe^{2+}(CN)_6$, and P is $Fe^{3+}$. This material has a low cost of <$1/kg. In some embodiments, polypyrrole (PPy) is used as an anionic electrode material. PPy can undergo p-type doping with chloride anions (FIG. 5). PPy has the following desirable properties as an anionic electrode material in a MEB: (1) it has an excellent capacity for reversible redox reactions with $Cl^-$; (2) PPy/$Cl^-$ electrode potential changes rapidly with a $Cl^-$ concentration; and (3) this material has a low cost of about $3/kg. By using a PB electrode and a PPy/$Cl^-$ electrode, electrode materials costs can be reduced, and further a charge step and its associated upfront energy investment can be omitted.

Figure 1:
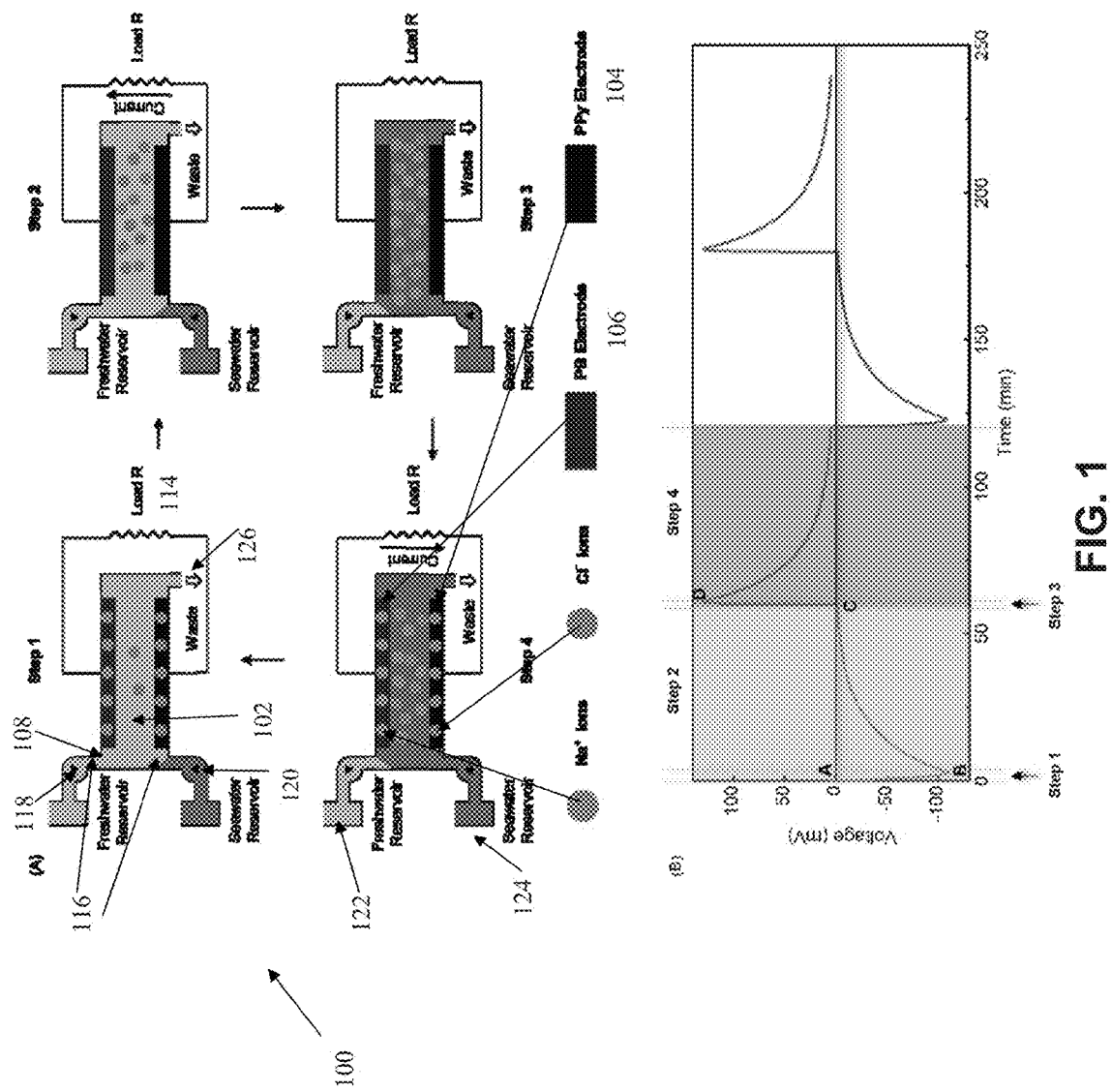
FIG. 1 shows: (A) Schematic of a mixing entropy battery (MEB) and a four-step energy recovery cycle; and (B) Energy recovery cycle of the charge-free MEB equipped with a Prussian Blue (PB) cationic electrode and a polypyrrole (PPy)/Cl$^-$ anionic electrode flushed with real seawater and wastewater effluent.

FIG. 1(A) shows a schematic of an electrochemical system 100 including a MEB 102 and related components. The MEB 102 includes a set of electrodes, namely an anionic electrode 104 and a cationic electrode 106, which are disposed within a housing 108 or other suitable container. The electrodes 104 and 106 are electrically connected to a circuitry, which includes a load 114. The flow of an electrical current through the load 114 represents the extraction of energy.

Still referring to FIG. 1(A), the housing 108 includes a set of inlets 116, which are fluidly connected to a set of pumps 118 and 120 (or other fluid conveyance mechanisms) and a set of reservoirs 122 and 124 (or other suitable containers). In particular, the reservoir 122 serves as a source of a low concentration solution (e.g., freshwater), which can be conveyed by the pump 118 into the MEB 102 through one inlet of the housing 108, and the reservoir 124 serves as a source of a high concentration solution (e.g., seawater), which can be conveyed by the other pump 120 into the MEB 102 through another inlet of the housing 108. As further explained below, the pumps 118 and 120 are operated so as to substitute or exchange one solution within the MEB 102 (and in which the electrodes 104 and 106 are immersed) with another solution, and to synchronize such substitution with respect to operation of the MEB 102. Upon substitution with one solution, a departing solution exits the MEB 102 through an outlet 126 of the housing 108. It should be recognized that the number of inlets, outlets, electrodes, and reservoirs can be varied from that illustrated in FIG. 1(A), such as by combining or sub-dividing these components. Also, while not illustrated in FIG. 1(A), a controller can be included to control the operation of the system 100, which controller can be implemented in software, hardware, or a combination of software and hardware.

As shown in FIG. 1(A), the MEB 102 recovers energy through a four-step (or four-stage) cycle. During a freshwater flush (Step 2), $Na^+$ and $Cl^-$ are released from the electrodes 104 and 106 into the low concentration solution, and a current flows from the anionic electrode 104 to the cationic electrode 106. During the seawater flush (Step 4), the ions are reincorporated into the electrodes 104 and 106 from the high concentration solution, and the current flow reverses. In Steps 1 and 3, the solutions are exchanged between freshwater and seawater, causing a voltage change in the MEB 102 that varies between a positive voltage and a negative voltage. In an alternative MEB, a potential of a cationic electrode can be always greater than a potential of an anionic electrode, resulting in a positive voltage of the MEB throughout the cycle. In this alternative MEB, Step 4 can be thermodynamically favorable because a current flows from an electrode with a higher potential to one with a lower potential. However, Step 2 would not be thermodynamically favorable, and involves additional energy input to drive release of ions from the electrodes. Energy produced during Step 4 exceeds the upfront energy investment during Step 2 because the voltage increased when freshwater is replaced by seawater, allowing additional energy recovery. The alternative MEB can convert salinity gradient into electricity. However, the upfront energy investment involves additional power supply devices and greater complexity.

Thermodynamically, an upfront energy investment can be avoided when the voltage of the MEB 102 is positive during seawater flush and negative during freshwater flush (FIG. 1(B)). When flushed with seawater, current flows from the cationic electrode 106 to the anionic electrode 104 spontaneously because the voltage is positive (Step 4). When flushed with freshwater, however, the voltage becomes negative, resulting in spontaneous current flow in the reverse direction (Step 2). In this scenario, energy is recovered during both freshwater flushes and seawater flushes, and no upfront energy investment is involved. To implement the charge-free MEB 102, the potential of the cationic electrode 106 and the anionic electrode 104 should be close.

Evaluation of MEB Prototype:

In some embodiments, PB is used as a cationic electrode material, and PPy is used as an anionic electrode material. PB was synthesized by a solution-based reaction by mixing about 0.5 M $FeCl_3$ solution with about 0.5 M $Na_3[Fe(CN)_6]$ solution at a pH of about 2. Obtained from this reaction was PB in its oxidized state (also called Berlin Green). The synthesized PB sample was then coated onto a carbon cloth current collector with a slurry coating method. FIG. 2(B) shows a scanning electron microscopy image of a carbon cloth coated with synthesized PB particles. FIG. 2(C) shows cyclic voltammetry of the resulting PB electrode in about 0.6 M NaCl solution. Two peaks were observed during both the oxidation sweep and the reduction sweep. These peaks indicate the reactions between $Fe^{3+}[Fe^{3+}(CN)_6]$ and $NaFe^{3+}[Fe^{2+}(CN)_6]$, and between $NaFe^{3+}[Fe^{2+}(CN)_6]$ and $Na_2Fe^{2+}[Fe^{2+}(CN)_6]$, respectively. The oxidation/reduction peaks at higher potential were not reversible because PB dissolved in solution when fully oxidized to $Fe^{3+}[Fe^{3+}(CN)_6]$. A galvanostatic potential profile in FIG. 2(D) confirmed the two-stage process during the oxidation and reduction of the PB electrode. Two potential plateaus were observed at 0 V to about 0.3 V and about 0.8 V to about 1 V. Despite the wide potential range, the PB electrode is desirably cycled within the lower potential plateau (0 V to about 0.3 V) because PB can become soluble when over-oxidized. FIG. 2(E) shows cycling performance of the PB electrode in about 0.6 M NaCl solution. During this test, the PB electrode was charged and discharged between 0 V and about 0.3 V at a constant current of about 1 mA for 50 cycles. The coulombic efficiency was maintained over about 99% with over 90% capacity retention after 50 cycles. Also tested is a sensitivity of a potential of the PB electrode to NaCl concentration change. As shown in FIG. 2(F), the PB electrode potential increased from about 0.133 V to about 0.248 V when the NaCl concentration increased from about 0.024 M to about 2 M. The potential change was close to the theoretical value calculated from the Nernst Equation, and the potential settled within about 10 s after solution exchange.

Figure 3:
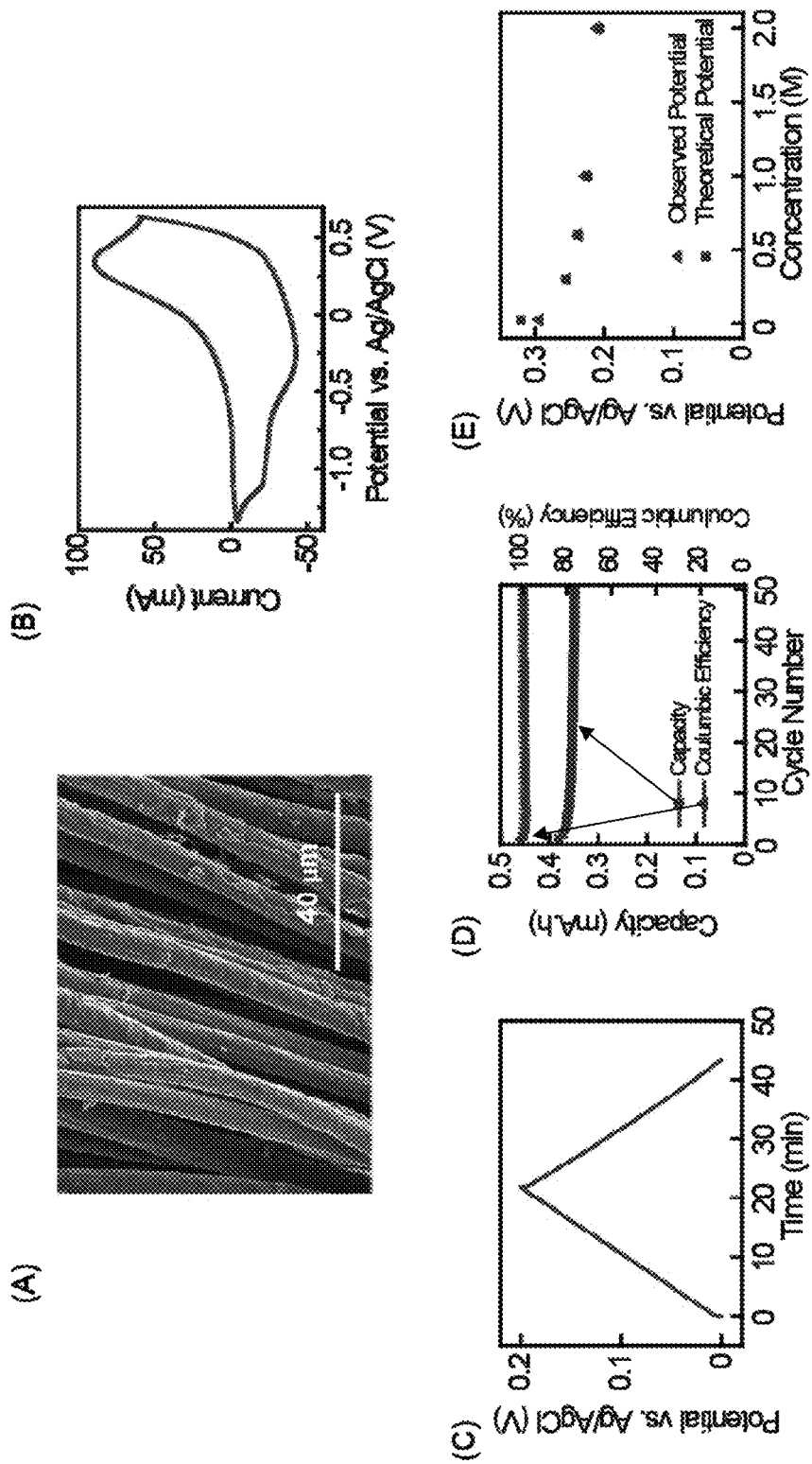
FIG. 3 shows: (A) Scanning electron microscopy image of a carbon cloth electrode coated with PPy by electrochemical polymerization; (B) Cyclic voltammetry of a PPy/Cl$^-$ electrode in about 0.6 M NaCl solution; (C) Galvanostatic cycle of the PPy/Cl$^-$ electrode in about 0.6 M NaCl solution; (D) Cycling performance of the PPy/Cl$^-$ electrode, showing coulombic efficiency and discharge capacity over 50 cycles; and (E) change in PPy/Cl$^-$ electrode potential with different NaCl concentrations (about 0.024 M, about 0.3 M, about 0.6 M, about 1 M, and about 2 M).

In some embodiments, a PPy/Cl$^-$ electrode was synthesized by electrochemical polymerization of pyrrole onto a carbon cloth current collector, using a supporting solution with about 0.1 M pyrrole and about 1 M NaCl. FIG. 3(A) shows a scanning electron microscopy image of the PPy/Cl$^-$ electrode with a polymer coated uniformly around carbon cloth fibers. FIG. 3(B) shows cyclic voltammetry of the PPy/Cl$^-$ electrode. As can be seen, an oxidation peak was observed at about 0.3 V; however, on a reverse sweep, two reduction peaks occurred. This shows that PPy has two doping sites. The oxidation peak and the reduction peak at higher potential indicate a reversible de-insertion and re-insertion of anions (Cl$^-$ in this case) at site 1. The reduction peak at lower potential corresponds to an insertion of cations (Na$^+$ in this case) at site 2. This process is not reversible because no corresponding peak was observed during the oxidation sweep. As an anionic electrode in a charge-free MEB, the potential of the PPy/Cl$^-$ electrode should be similar as the PB cationic electrode. When cycled within the same range (0 V to about 0.3 V) as the PB electrode, the insertion of Na$^+$ is avoided and reversible reactions with Cl$^-$ is selectively allowed. FIG. 3(C) shows a galvanostatic potential profile of the PPy/Cl$^-$ electrode in about 0.6 M NaCl solution. In the potential range between 0 V to about 0.3 V, the insertion/extraction of Cl$^-$ is selectively allowed, so that no potential plateau was observed. The PPy/Cl$^-$ electrode also showed excellent cycling performance in this potential range with over about 99% coulombic efficiency and over 90% capacity retention throughout 50 cycles (FIG. 3(D)). Also tested is a sensitivity of a potential of the PPy/Cl$^-$ electrode to NaCl concentration change. Unlike the PB electrode, the PPy/Cl$^-$ electrode potential decreased from about 0.294 V to about 0.211 V when the NaCl concentration increased from about 0.024 M to about 2 M (FIG. 3(E)). The potential change was also close to the theoretical value, and the potential settled within about 10 s after solution exchange.

As noted above, the PB electrode and the PPy/Cl$^-$ electrode showed excellent electrochemical properties and a similar potential range. A plate-shape MEB was constructed with the PB electrode as the cationic electrode and the PPy/Cl$^-$ electrode as the anionic electrode. The MEB was connected to an about 300Ω resistor. A potentiostat (Biologic SP-50) was used to monitor energy production. During operation of the MEB, a wastewater effluent and seawater were alternatively flushed into the MEB every 1 hour. The freshwater used was a wastewater effluent from the Palo Alto Regional Water Quality Control Plant. The seawater used was collected from Half Moon Bay, Calif. Both the PB electrode and the PPy/Cl$^-$ electrode were pre-cycled to the same potential in seawater as a starting point. FIG. 1(B) shows energy recovery cycles of the charge-free MEB. The cycle starts from Point A when potentials of the PB electrode and the PPy/Cl$^-$ electrode were substantially the same in seawater, making the voltage of the MEB close to 0 V. In Step 1, the MEB was flushed with wastewater effluent. Due to the salinity decrease, the MEB voltage decreased to about −130 mV (Point B). In Step 2, the MEB was allowed to discharge in wastewater effluent until the potentials of the two electrodes are substantially equalized (Point C). Then, in Step 3, a solution exchange from wastewater effluent to seawater resulted in a MEB voltage increase to about +130 mV (Point D) because the salinity increased during this step. In Step 4, the MEB was allowed to discharge in seawater until the potential substantially equalizes between the two electrodes. From one complete cycle, an energy recovery of about 106.5 mJ was achieved. The voltage ratios were about 85.8% during Step 1 and about 95.4% during Step 3. The voltage ratios were different because the resistance of freshwater was higher than the resistance of seawater. The maximum power output was about 62.6 mW/m$^2$ recorded right after the solution exchange from freshwater to seawater. The average power output during the four-step cycle was about 16.4 mW/m$^2$. During this four-step cycle, Step 2 and Step 4 were spontaneous discharges, and Step 1 and Step 3 were solution exchanges. Energy was produced in both Step 2 and Step 4 without additional energy investment except for pumping energy used during solution exchanges.

Figure 4:
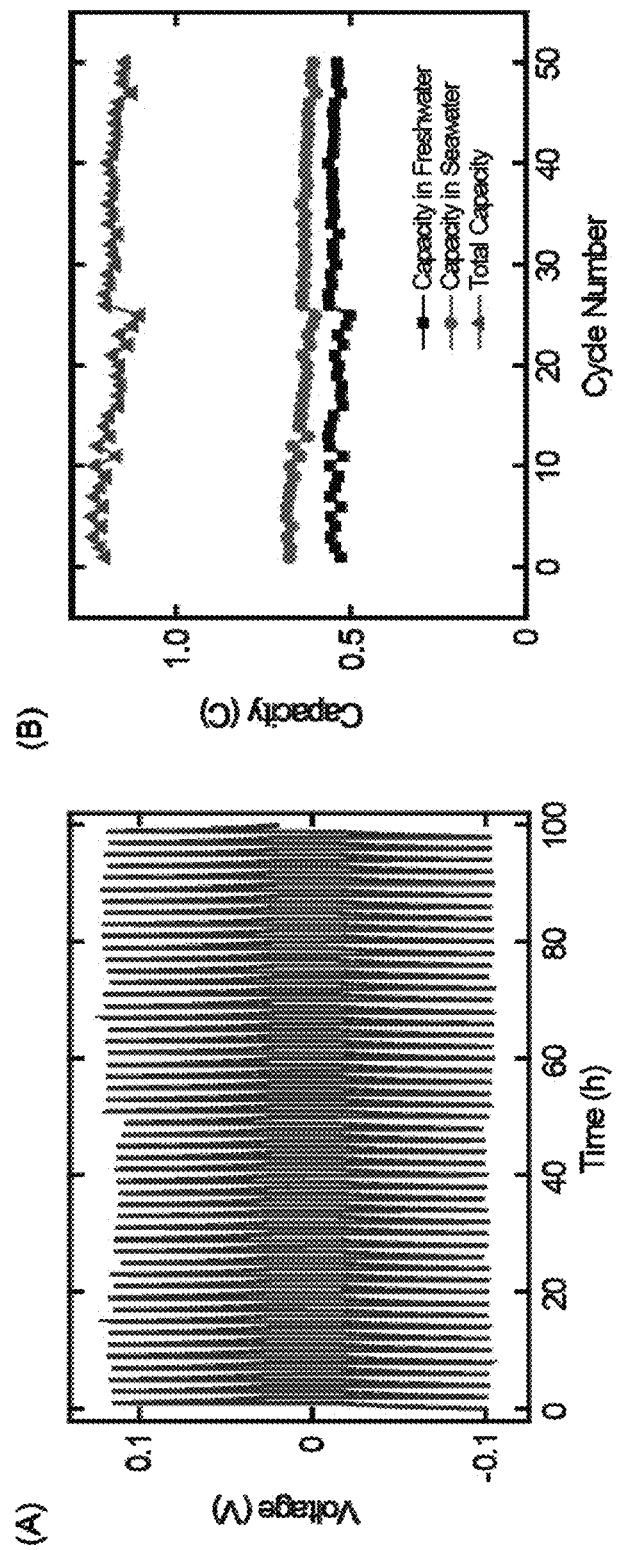
FIG. 4 shows cycling performance of a charge-free MEB: (A) Voltage profile of the MEB operated for 50 cycles; and (B) Energy recovery of the MEB over 50 cycles.

Also tested is the long-term performance of the charge-free MEB with the PB electrode and the PPy/Cl$^-$ electrode. The MEB was stable for 50 cycles (FIGS. 4(A) and (B)) with less than about 7% decrease in energy recovery. Therefore, it can be concluded that PB and PPy/Cl$^-$ are desirable as cationic and anionic electrode materials for the charge-free MEB. Both showed desired properties including: (1) low cost, (2) similar electrode potential range, (3) sensitivity of electrode potential to NaCl concentration change, (4) reversible reaction with Na$^+$ or Cl$^-$, and (5) excellent cycling performance and stability in aqueous solution. These materials also allowed operation of the MEB without a charge step and upfront energy investment.

Scale-Up MEB Prototype:

The following sets forth the design of a MEB reactor at a larger scale, with an electrode size of about 10 cm$^2$ (instead of about 3 cm$^2$ at a smaller scale), in order to evaluate energy recovery efficiency when the MEB was scaled up. The reactor was custom-designed to reduce mechanical losses to overall efficiency loss during scale up.

Figure 6:
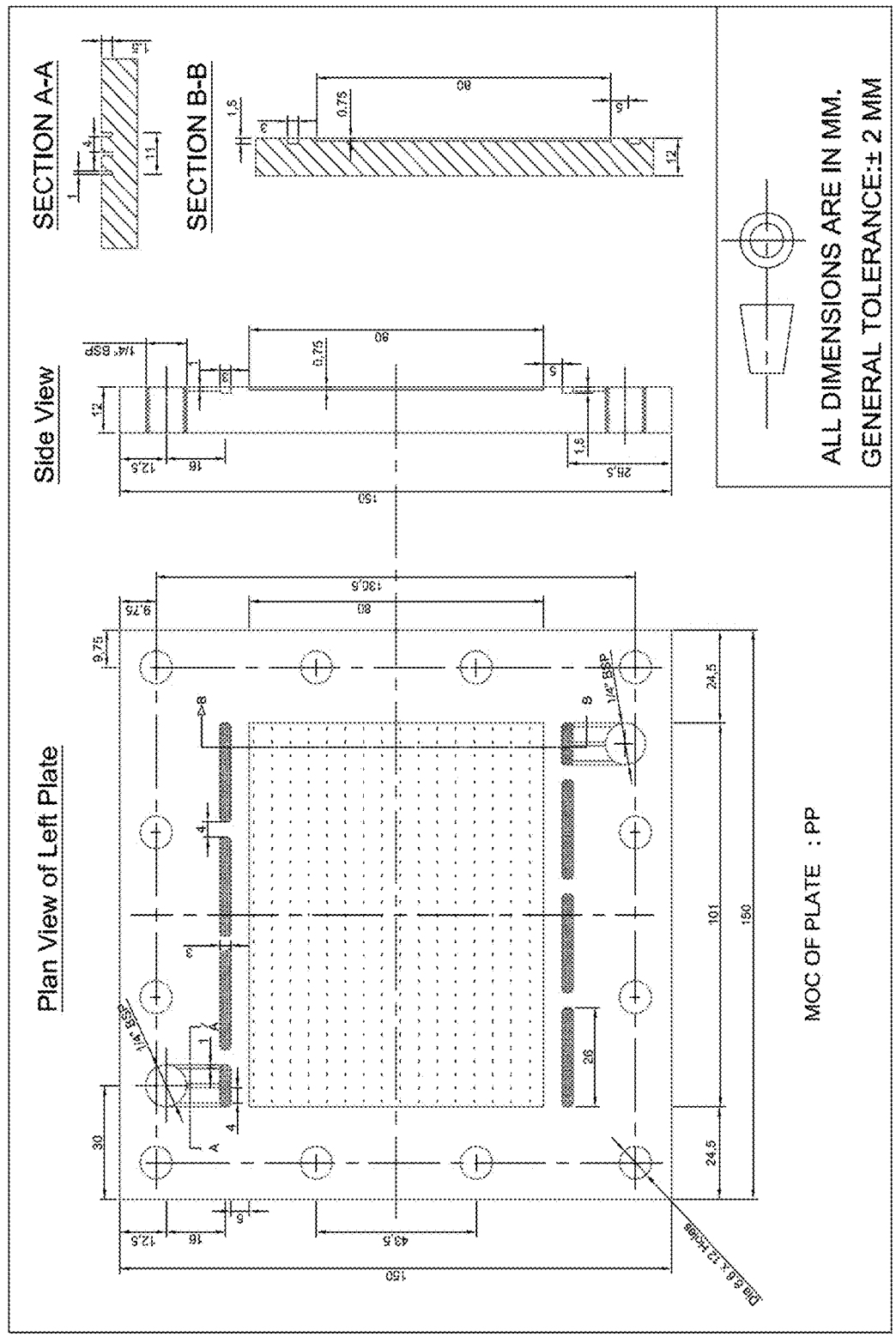
FIG. 6 shows plan, side and sectional views of a left plate of a prototype MEB.
Figure 7:
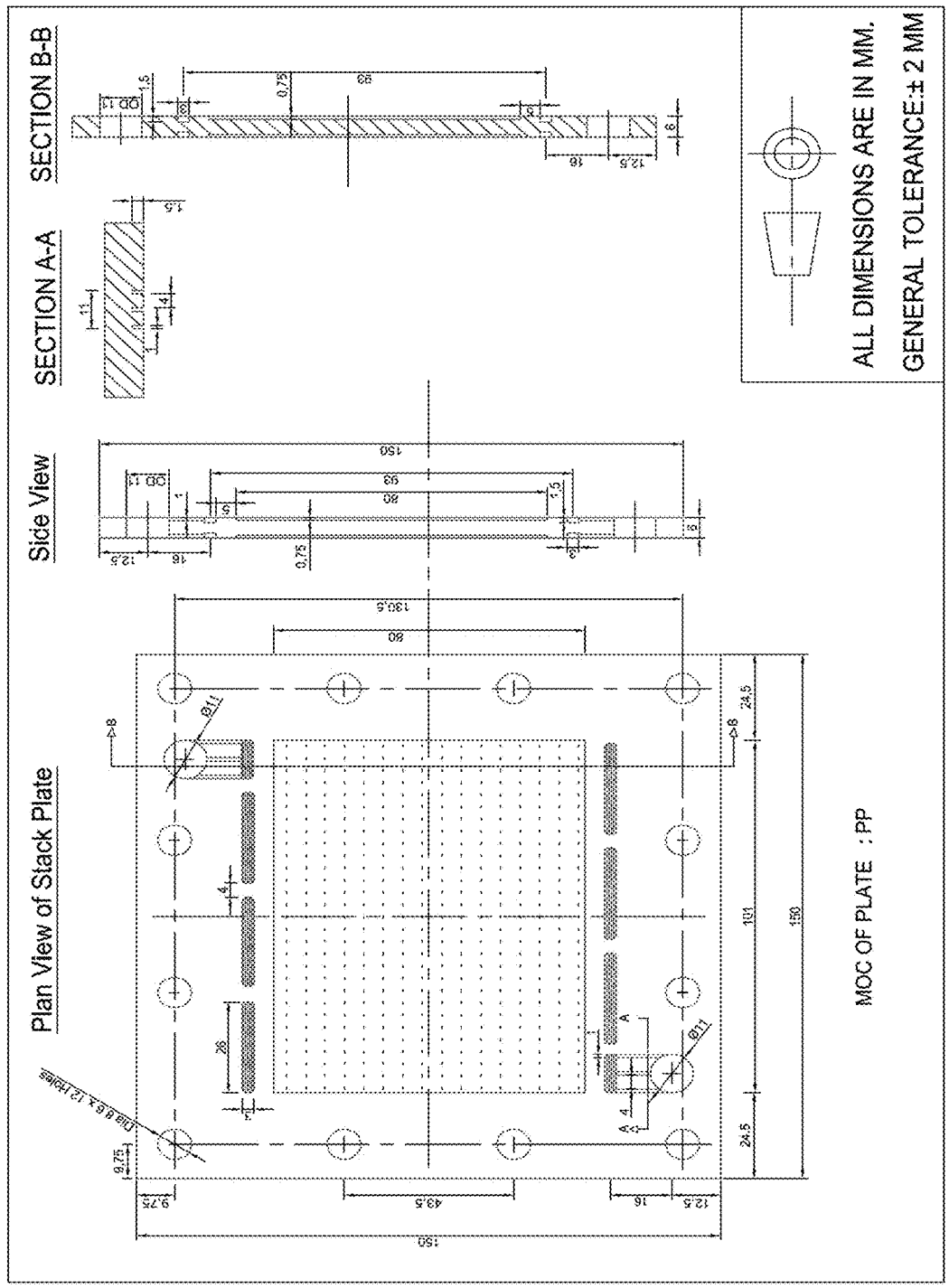
FIG. 7 shows plan, side and sectional views of a stack plate of a prototype MEB.
Figure 8:
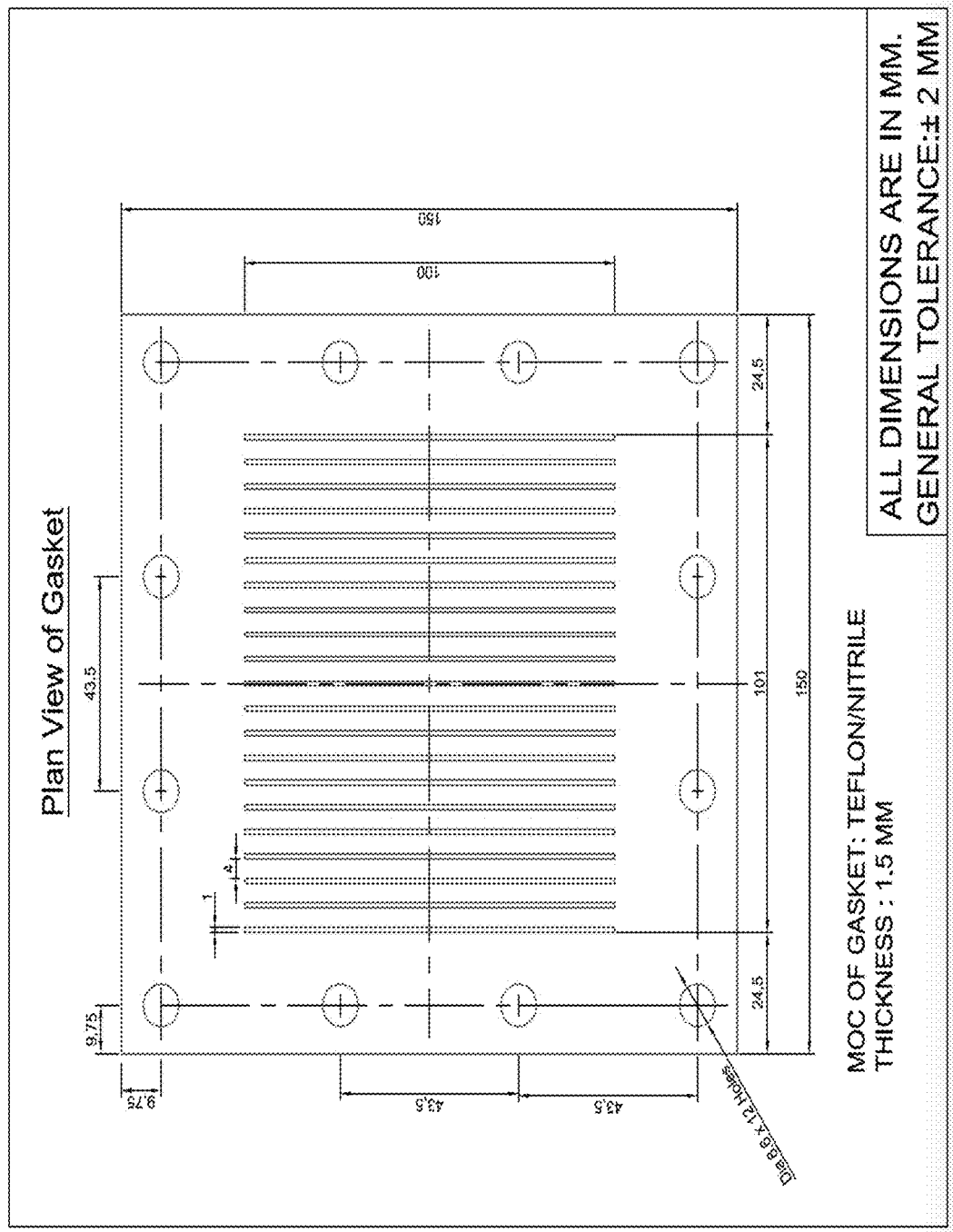
FIG. 8 shows a plan view of a gasket of a prototype MEB.
Figure 10:
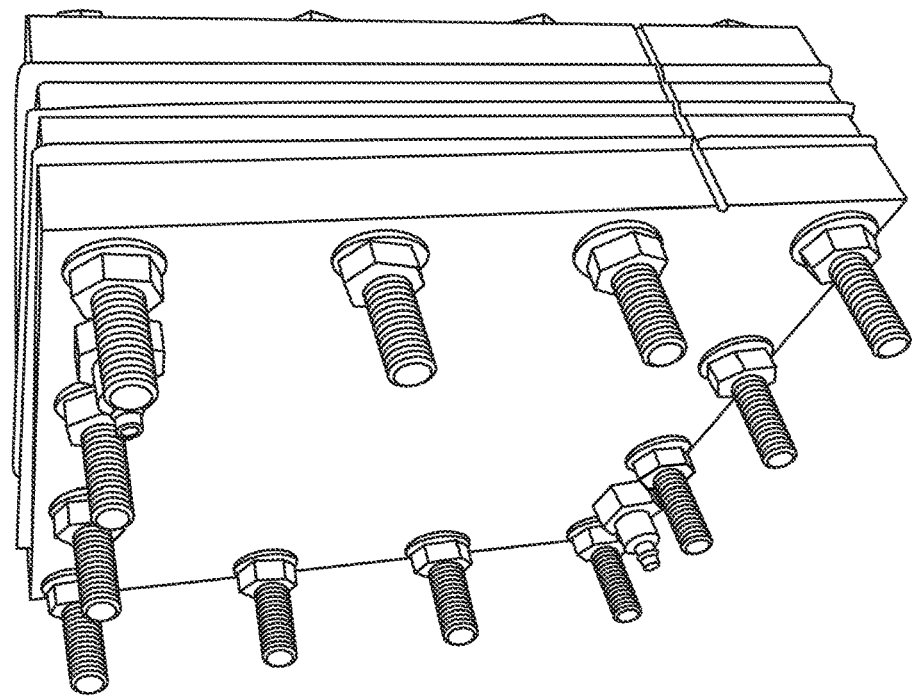
FIG. 10 shows images of a prototype MEB.
Figure 10:
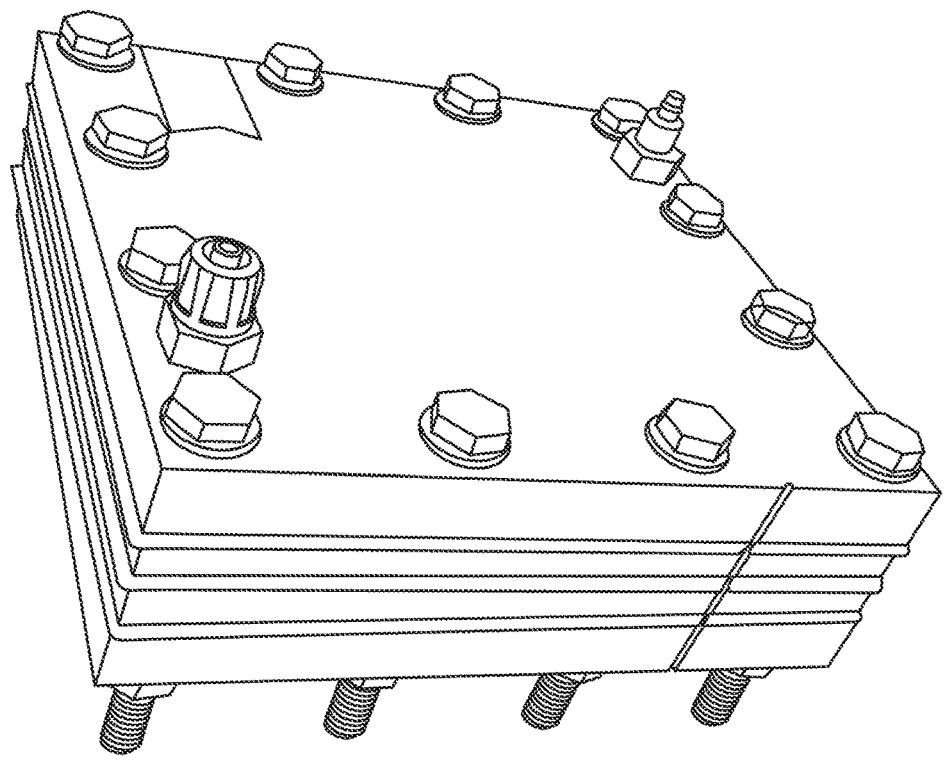

Seawater and freshwater can be alternatively flushed into this reactor. This means that, when the reactor is in operation, there will be times during which freshwater or seawater already in the reactor is flushed by seawater or freshwater, respectively, and during these times there will be mixing of seawater and freshwater. The MEB reactor produces energy based on salinity gradient between seawater and freshwater, and thus when alternatively flushing the solutions, a sharp change in salinity is desired for maximum efficiency of energy production, as compared to a gradual dilution of seawater or concentration. This indicates that reducing the extent of mixing between seawater and freshwater is desired. The reactor described here is designed with a feature to reduce mixing by guiding water flow through micro channels which have a large length to width ratio, thereby rendering the reactor to behave like a plug flow system. Computer-aided designs of the MEB reactor are shown in FIGS. 6-8. Images of the MEB reactor are shown in FIG. 10.

The following tests were performed. First, the computer-aided designs as shown in FIGS. 6-8 were performed with a design factor of safety of 5. Second, a volume test was performed, and a volume of the MEB reactor was found to be about 72 ml. Third, a leak test was performed. No external pressure was applied since the reactor is not expected to experience any additional pressure. The reactor was filled with tap water, weighed (W1), and left as is overnight. The weight of the reactor was measured after about 10 hours in the morning (W2), and there was no noticeable change in weight (W2=W1). This indicates that there was no noticeable water loss from the reactor and thereby no leakage. Fourth, freshwater and seawater are alternatively pumped into the reactor.

Figure 9:
FIG. 9 shows evolution of mixing in the design of a prototype MEB.

It is desired that a salinity of water in the reactor change sharply and not gradually between cycles. In other words, reduced mixing is desired to recover more energy from a given amount of fresh water. The degree of mixing in the reactor was measured by the following method: (a) tap water is pumped into reactor until full; (b) continuous output of tap water from reactor is ensured; (c) colored water (water+methyl orange) is pumped into the reactor; (d) output is collected in different containers as time passes; (e) when slight orange colored output is noticed, output collection containers are changed every about 2 seconds to observe evolution of mixing; and (f) once output color close to original methyl orange colored water is obtained, collection is stopped. FIG. 9 shows the evolution of mixing with time, where from left to right: (1) an initial water sample (about 2 ml taken from about 100 ml initial water), (2) a sample when color was first observed on mixing, (3-8) about 2 ml volumes of successive output collection (actual output volumes), and (9) an original colored methyl orange water.

Calculation of a degree of mixing is performed as follows:
Volume of reactor=72 ml
Volume for completion of mixing from samples 3 to 8 above=14 ml
Volume percentage of water that underwent mixing over volume of reactor =14/72×100%=19.44%
Degree of Mixing=19.44%, which is a reduced degree of mixing achieved with the MEB prototype instead of 100% mixing in a reactor with no flow channels to guide water As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set can be the same or different.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the terms "connect," "connected," "connecting," and "connection" refer to an operational coupling or linking. Connected objects can be directly coupled to one another or can be indirectly coupled to one another, such as through another set of objects.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. An electrochemical system comprising:
    a battery including an anionic electrode and a cationic electrode;
    a first source of a first solution;
    a second source of a second solution, wherein the second solution has a greater salinity than the first solution; and
    a fluid conveyance mechanism connected between the battery and each of the first source and the second source,
    wherein the electrochemical system is configured such that:
        during a first discharge stage of the battery, the anionic electrode and the cationic electrode are in contact with the first solution, and
        during a second discharge stage of the battery, the anionic electrode and the cationic electrode are in contact with the second solution, and
    wherein the fluid conveyance mechanism is configured to exchange the first solution with the second solution between the first discharge stage and the second discharge stage.

2. The electrochemical system of claim 1, wherein a voltage of the battery is negative during at least a portion of the first discharge stage.

3. The electrochemical system of claim 1, wherein a voltage of the battery is positive during at least a portion of the second discharge stage.

4. The electrochemical system of claim 1, further comprising a load connected between the anionic electrode and the cationic electrode, and wherein a current is configured to flow through the load from the anionic electrode to the cationic electrode during at least a portion of the first discharge stage.

5. The electrochemical system of claim 1, further comprising a load connected between the anionic electrode and the cationic electrode, and wherein a current is configured to flow through the load from the cationic electrode to the anionic electrode during at least a portion of the second discharge stage.

6. The electrochemical system of claim 1, wherein the cationic electrode includes a Prussian Blue material.

7. The electrochemical system of claim 1, wherein the anionic electrode includes polypyrrole.

8. The electrochemical system of claim 1, wherein the fluid conveyance mechanism is configured to exchange the second solution with the first solution between the second discharge stage and the first discharge stage.

9. A method of converting salinity gradient into electricity, comprising:
   providing a battery including an anionic electrode and a cationic electrode;
   discharging the battery while the anionic electrode and the cationic electrode are in contact with a first solution having a first salinity;
   exchanging the first solution with a second solution having a second salinity, wherein the second salinity is greater than the first salinity; and
   discharging the battery while the anionic electrode and the cationic electrode are in contact with the second solution.

10. The method of claim 9, wherein a voltage of the battery is negative during at least a portion of discharging the battery while the anionic electrode and the cationic electrode are in contact with the first solution.

11. The method of claim 9, wherein a voltage of the battery is positive during at least a portion of discharging the battery while the anionic electrode and the cationic electrode are in contact with the second solution.

12. The method of claim 9, wherein discharging the battery while the anionic electrode and the cationic electrode are in contact with the first solution includes flowing a current from the anionic electrode to the cationic electrode.

13. The method of claim 9, wherein discharging the battery while the anionic electrode and the cationic electrode are in contact with the second solution includes flowing a current from the cationic electrode to the anionic electrode.

14. The method of claim 9, wherein the cationic electrode includes a Prussian Blue material.

15. The method of claim 9, wherein the anionic electrode includes polypyrrole.

* * * * *